June 10, 1952 R. FRASER 2,599,550
FLUXMETER AND PROBE THEREFOR
Filed April 27, 1949 2 SHEETS—SHEET 2
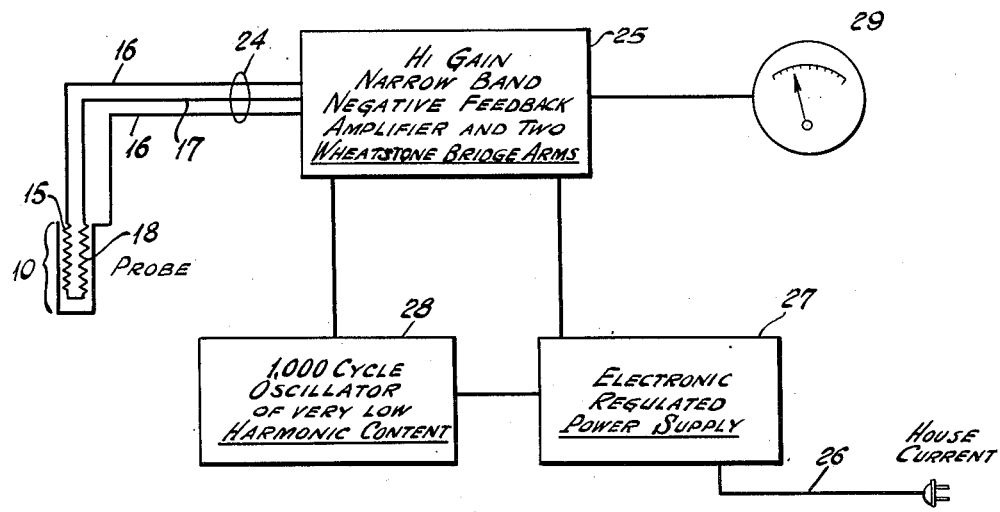
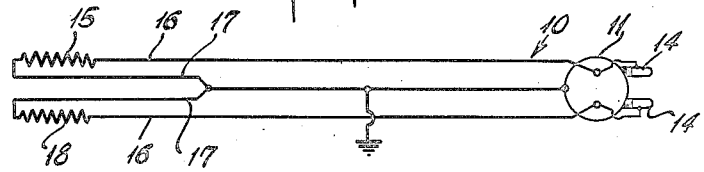
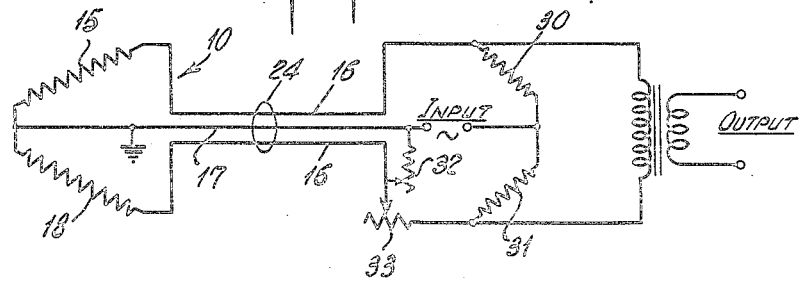
INVENTOR
ROBERT FRASER
BY
ATTORNEYS Patented June 10, 1952

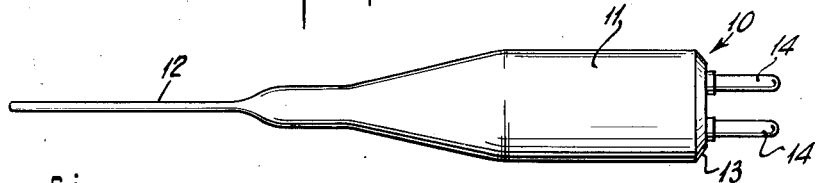
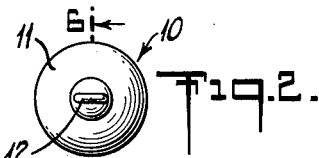
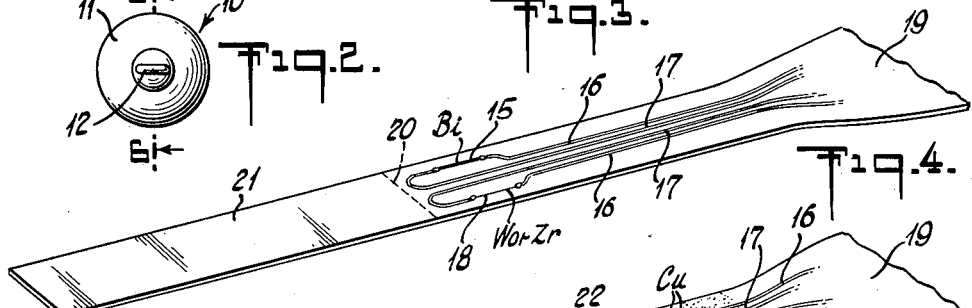
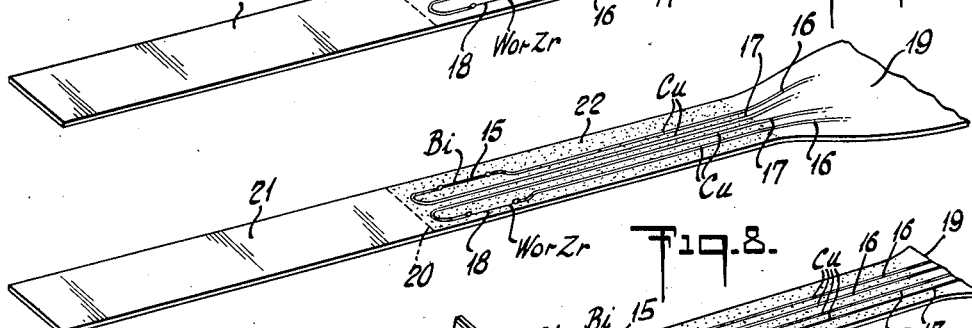
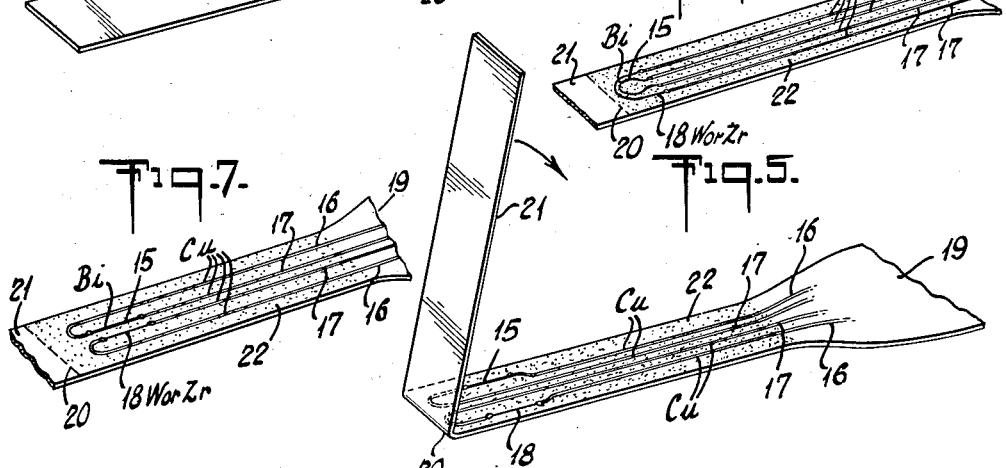
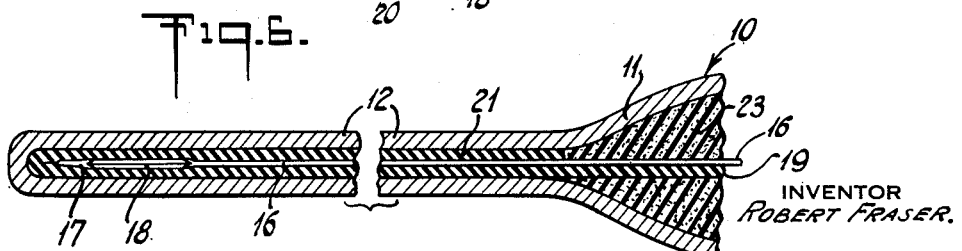
INVENTOR
ROBERT FRASER.

2,599,550

UNITED STATES PATENT OFFICE 2,599,550

FLUXMETER AND PROBE THEREFOR

Robert Fraser, Great Neck, N. Y.

Application April 27, 1949, Serial No. 89,885

6 Claims. (Cl. 175—183)

1

The present invention relates to magnetic flux measuring apparatus of a type generally similar to that disclosed in the patent to Smith No. 2,260,589 of October 28, 1941; and, more particularly, to bridge circuit features thereof and probe constructions usable therein.

A general object of the present invention is to provide such apparatus which is readily constructed and can be employed efficiently to give direct readings of the flux in magnetic fields where probe access space is very small, with the probe containing only part of the bridge circuit therein uniquely strain compensated and with the bridge circuit temperature compensated for a relatively wide range of temperature.

A more specific object of the present invention is to provide a probe containing two of the four arms of a Wheatstone bridge, the effective resistance portions of the two in the probe being formed of metallic materials having substantially the same temperature coefficient of resistivity and substantially the same total electrical resistance with one being relatively magnetically-insensitive and the other being relatively highly magnetically-sensitive in that it is subject to relatively large change in resistance as a function of change of flux in a magnetic field, with both being of substantially the same length for strain compensation.

A further object of the invention is to provide temperature compensation by forming the relatively magnetically-insensitive arm of a metallic material the temperature coefficient of resistivity of which is substantially equal to that of the magnetically-sensitive arm; and if such coefficient is slightly higher, so that resistance response of the former will be greater than that of the latter with change in temperature tending to produce change in phase voltage, effectively preventing that condition from giving rise to error by balancing that greater resistance response with a shunt resistance of smaller coefficient.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

2

Fig. 1 is a side elevational view of a probe construction of the present invention enlarged about four times normal size;

Fig. 2 is an end view of the probe shown in Fig. 1;

Fig. 3 is a perspective view of internal elements of the probe shown in Figs. 1 and 2, with parts broken away, showing steps of formation and details of assembly of parts;

Fig. 4 is a view similar to Fig. 3, showing the next step of formation;

Fig. 5 is a perspective view somewhat similar to Fig. 4, but showing manipulation of one part in a subsequent step;

Fig. 6 is an enlarged sectional view taken substantially on line 6—6 of Fig. 2, and with parts broken away;

Fig. 7 is a view similar to Fig. 4, but with additional parts broken away, showing a modification of the pattern of bridge arms in the probe;

Fig. 8 is a view similar to Fig. 7 of a further modification of the pattern of bridge arms in the probe;

Fig. 9 is an electrical block diagram of fluxmeter apparatus suitable for employment of the probe of Figs. 1 to 6, inclusive;

Fig. 10 is a wiring diagram of an embodiment of the probe; and

Fig. 11 is a wiring diagram of the Wheatstone bridge of the device of which the probe forms a part, showing shunt and series resistance features of the present invention.

Referring to the drawings, like numerals identify similar parts throughout and, as will be seen, probe 10 of the fluxmeter of the present invention includes a casing 11, preferably of suitable magnetically-insensitive material. The casing 11, in a preferred form, is made of metallic material to serve as an electrostatic shield, particularly when grounded, and may be formed of aluminum, copper, brass or bronze. One end 12 of the casing 11 is formed as a flat sheathing adapted to contain flux responsive elements, and that casing is enlarged at the other end 13 to receive therein any suitable insulating mounting means supporting a pair of terminal plugs 14, 14.

As will be seen from Figs. 3 to 6 inclusive, the probe casing 11 houses two arms of a Wheatstone bridge and suitable supporting and insulating means. As shown in Fig. 3, the effective resistance portion 15 of one bridge arm is connected at its ends to copper leads 16 and 17 by any suitable means, such as a type of solder well known in the art. The bridge arm portion 15 is provided as a certain length of relatively highly magnetically-sensitive metallic material characterized by relatively large change in resistance as a function of change of flux in a magnetic field in which it may be located, and is preferably formed of bismuth. The effective resistance portion 18 of the other bridge arm is likewise connected between similar copper leads 16 and 17 in a similar manner and is of substantially the same length as portion 15. Bridge arm portion 18 is formed of relatively magnetically-insensitive metallic material and, in accordance with the present invention, is made of tungsten, zirconium or other metallic material having similar electrical characteristics. In accordance with the present invention, the two bridge portions 15 and 18 need be of approximately the same temperature coefficient of resistivity so as to assure proper operation of the apparatus within a wide range of temperatures that may be encountered in use of the device. For example, the temperature coefficient of resistivity of bismuth is 0.004. That coefficient of both tungsten and zirconium is 0.0045. The slightly greater value of that coefficient for tungsten or zirconium is accommodated by another feature of the present invention hereinafter fully described in connection with temperature compensation.

Preferably the two bridge arms comprising the portions 15 and 18 and their copper leads 16 and 17 are laid out in a pattern, such as that proposed in Figs. 3, 4 and 5, upon suitable sheet insulation 19, such as heat insulating paper. The paper sheet 19 is in the form of a strip having a fold line 20 beyond the end of the bridge arms to define a lapping portion 21. As indicated in Fig. 4, with the bridge arms and their leads laid out upon the paper strip 19, they are suitably held in position by a body 27 of insulating cement such as transparent synthetic plastic cement, well known for household use. Before the cement has set, the lapping portion 21 is lapped back over the bridge arm portions and their leads, as proposed in Fig. 5, so that the metallic elements will be completely covered by insulating material, and suitably insulated from each other in anchored positions upon setting of the cement.

As shown in Fig. 6, the so-insulated and mounted bridge arms 15 and 18 are then inserted into the reduced flat end portion 12 of the casing 11, and suitable insulating filler material 23 is filled into the enlarged portions of the casing. The body 23 of insulating material may serve at the enlarged end 13 of the probe as a support for terminal prongs 14, 14, or such support may be supplemented thereat by a disc of insulating material, such as Bakelite. One terminal copper wire 16 is connected to one of the plugs 14, and the other terminal wire 16 is connected to the other plug. Terminal wires 17, 17 may be respectively connected together with a connection at the end 13 to the casing 11, as suggested in the wiring diagram of Fig. 10, or brought out separately to that end of the casing and there individually connected thereto, such as by being clamped between the inner wall of the casing and the edge of the supporting disc of insulating material, if employed. Thus, there is a common ground connection to the metallic casing 11 which preferably is to be grounded when the probe is plugged into a suitable jack on the end of a connecting cable leading to the remaining portions of the apparatus. Such grounding connection may be effected by a metallic sheathing of that cable brought to contact with the probe casing 11 upon plug-in connection of the latter to the cable.

Figs. 7 and 8 show modified patterns or arrangements of the two bridge arms 15 and 18 on the paper base 19, which may be adopted, if desired, within the scope of the invention. The arrangement of Fig. 8 is particularly suited to location of the bridge arms 15 and 18 in a minimum area, which may be desired in the measurement of field flux of certain types of equipment.

In order to appreciate the very small dimensions desirably permitted by such probe construction, so that the flat sensitive end 12 thereof may be received in very small spaces between the field poles of electrical devices, physical dimensions and electrical characteristics are here tabulated and indicated:

| Bridge Arm Portion | Length | Diameter | T. coef. $\rho$ | Resistance |
|---|---|---|---|---|
|  | Inch | Inch |  |  |
| (15) Bi | 3/16 | 0.001 | 0.004 | approx. 8 $\Omega$. |
| (18) W | 3/16 | 0.0003 | 0.0045 | approx. 8+ $\Omega$. |

Bronze probe casing (11) 1½" l.; dia. large end (13) 0.250"; small end (12) thickness 0.040", width 0.125".

It will be understood that, despite the very small dimensions of such probe structure, ease in manipulation can be assured by supplementing it with a handle portion that may consist of a cylindrical aluminum or plastic jacket carrying the jack at one end connected to cable conductors extending through the jacket to the flexible portion of the cable. The metallic sheathing of the cable may be connected to the other end of the jacket, if metallic, to ground it, or if the jacket is non-metallic a grounding lead may extend therethrough from the probe casing 11 to the metallic cable sheathing. Such handle may be an aluminum tube about 5/8" in diameter and about 4½" long, with the previously described probe structure 10 constituting the feeler part thereof and with the feeler and handle together constituting a pen-like probe about 6" long.

As shown in Fig. 9, the conductors of cable 24, which form continuations of the copper probe conductors 16, 16 and the common grounded conductor 17, are connected to a suitable high grain, narrow band, negative feedback amplifier 25 within the casing of which are suitably mounted the other two arms of the Wheatstone bridge. A common alternating current supply, such as 110 v. house current 26, is connected through a suitable electronic regulated power supply unit 27, and a 1000 cycle oscillator of very low harmonic content 28 to the amplifier unit 25, with the output side of the latter connected to a suitable voltmeter 29 calibrated in Gauss.

Although the temperature coefficients of resistivity of the two arms 15 and 18 of the Wheatstone bridge located in the probe 10 are approximately equal, actually that of the magnetically-insensitive arm 18 is slightly higher, as will be seen from the above and, as a result, the resistance response of that arm will lead that of the other with affecting temperature change. Considerable temperature compensation is effected by the fact that the temperature coefficients of resistivity are approximately equal, and by the fact that the effective portions of the two arms are of substantially equal electrical resistance. Further temperature compensation, so as to avoid error in balance which may be produced in the bridge as a result of the slightly higher temperature coefficient of resistivity of the magnetically-insensitive arm, is accomplished in accordance with the present invention by placing a high resistance in shunt with that arm 18. Any loss of resistance in that magnetically-insensitive arm 18 due to the shunt resistance can be regained by inserting in series with that arm an additional relatively low resistance. Such shunt and series resistances are preferably of the adjustable type so that after careful adjustment, the apparatus will give substantially correct readings for considerable temperature changes of the bridge.

The circuit of such construction is shown in Fig. 11. The magnetically-sensitive bridge arm 15 is connected through cable 24 to a third arm 30 of the Wheatstone bridge. The magnetically-insensitive bridge arm 18 is connected through cable 24 to the fourth arm 31 of the Wheatstone bridge. As previously indicated the Wheatstone bridge arms 30 and 31 are suitably located in the amplifier unit 25; and they are constructed of any metallic material having substantially zero temperature coefficient of resistivity, such as manganin. Between conductor 16 leading from the magnetically-insensitive bridge arm 18 and the bridge resistance arm 31 there are located in the amplifier unit 25 such resistance means to effect that desired temperature compensation. Adjustable shunt resistance 32 is connected between conductor 16 leading from the magnetically-insensitive arm 18 and grounded conductor 17, and such resistance which thus shunts arm 18 may be of the magnitude of three hundred and fifty ohms (350 Ω), and should be of a smaller coefficient of resistivity than arm 18, such as by being made of a suitable alloy, e. g. manganin or advance. The adjustable compensating series resistance is shown at 33 as being connected between that conductor 16 and bridge arm 31, and may be of the order of six ohms (6Ω). These features, particularly that of the shunt resistance, are quite important to the flexibility of use of the fluxmeter and its efficiency.

As indicated above, in a particular embodiment of the present invention using tungsten wire for the magnetically-insensitive arm portion 18 that wire is less than one third the diameter of the other magnetically-sensitive bismuth wire arm portion 15, so that they may be of substantially the same length while being of approximately equal electrical resistance. Such equality in length assures strain compensation. Of course, connecting conductors 16, 16 are of the same gauge, length and material; as are conductors 17, 17.

It will thus be seen that the objects set forth above and those made apparent from the preceding description are efficiently attained by fluxmeter apparatus characterized by the features herein particularized and claimed. Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A fluxmeter probe comprising, in combination, a casing; only two adjacent arms of a Wheatstone bridge circuit mounted in said casing with the effective resistance portions of both being of substantially equal length, approximately the same temperature coefficient of resistivity and substantially the same total electrical resistance in a field of zero flux, one of said arm portions being of a relatively highly magnetically-sensitive metallic material subject to relatively large change in resistance as a function of change of flux in a magnetic field in which it may be located, the other of said arm portions being of another metallic material relatively magnetically-insensitive as to its resistance characteristics; and electrical conductive means providing for connection of said encased arms to the remainder of the Wheatstone bridge circuit and a responsive meter circuit both externally of said casing.

2. The fluxmeter probe as defined in claim 1 characterized by the formation of said magnetically-sensitive arm portion mainly from bismuth and said magnetically-insensitive arm portion mainly from one of the elements tungsten and zirconium.

3. The fluxmeter probe as defined in claim 2 characterized by the formation of said casing from a substantially non-magnetic metallic material to serve as an electrostatic shield having no material effect on the flux measuring ability of said probe and associated apparatus.

4. The fluxmeter probe as defined in claim 3 characterized by the provision of said casing as an elongated tubular sleeve closed and flattened at one end and formed from a metallic material selected from the group consisting of aluminum, copper, brass and bronze; a layer of insulating material forming a lining for said flattened portion, within which said two arm portions are inserted; terminal members mounted on and exteriorly exposed at the other end of said sleeve; and electrical conductors of copper connecting said arm portions to said terminal members.

5. A direct reading instrument for measuring magnetic flux density comprising, in combination; a resistance Wheatstone bridge having two adjacent arms mounted in probe means with the effective resistance portions of both of said arms being of substantially equal length, approximately the same temperature coefficient of resistivity and substantially the same total electrical resistance in a field of zero flux, one of said arms being of relatively highly magnetically-sensitive metallic material subject to relatively large change in resistance as a function of change of flux in a magnetic field in which it may be located and the other being relatively magnetically-insensitive as to its resistance characteristics; amplifier and detector means operable on A. C. containing the other two arms of said bridge, the latter two adjacent bridge arms being remotely located from said probe means normally to be outside the sphere of influence of the magnetic field in which said probe means may be inserted for measurement of the strength thereof and substantially alike in response with respect to their environment, said amplifier being adapted to produce a signal which correspondingly varies with unbalancing of said bridge whereby signal strength increases with increase in magnetic field strength; means to connect an A. C. source to said means; and a current meter connected to the output of said amplifier calibrated directly in Gauss and giving deflection readings which increase correspondingly to increase in signal strength.

6. A direct reading instrument for measuring magnetic flux density comprising, in combination, a resistance Wheatstone bridge having two adjacent arms mounted in probe means with one being formed of bismuth to be relatively highly magnetically-sensitive and subject to relatively large change in resistance as a function of change of flux in a magnetic field in which it may be located, the other arm comprising one of the elements tungsten and zirconium to be relatively magnetically-insensitive as to its resistance characteristics, amplifier and detector means operable on A. C. containing the other two arms of said bridge, the latter two adjacent bridge arms being remotely located from said probe means normally to be outside the sphere of influence of the magnetic field in which said probe means may be inserted for measurement of the strength thereof and substantially alike in response with respect to their environment, said amplifier being of the high gain, narrow band negative feedback type and adapted to produce a signal which correspondingly varies with unbalancing of said bridge whereby signal strength increases with increase in magnetic field strength, means to connect the instrument to the usual A. C. house supply, an electronic regulated power supply means and increased cycle oscillator means of very low harmonic content characteristics connected between said supply means and said amplifier means, and a current meter connected to the output of said amplifier calibrated directly in Gauss and giving deflection readings which increase correspondingly to increase in signal strength.

ROBERT FRASER.

REFERENCES CITED

The following references are of record in the file of this patent:

UNITED STATES PATENTS

| Number | Name | Date |
|---|---|---|
| 1,946,710 | Pickard | Feb. 13, 1934 |
| 2,260,589 | Smith | Oct. 28, 1941 |
| 2,335,117 | Harrison | Nov. 23, 1943 |
| 2,447,880 | Seaver | Aug. 24, 1948 |